US012583103B2

(12) United States Patent
Lee et al.

(10) Patent No.: US 12,583,103 B2
(45) Date of Patent: Mar. 24, 2026

(54) ROBOT ARM CONTROL DEVICE, METHOD FOR TRAINING HIERARCHICAL REINFORCEMENT LEARNING MODEL FOR ROBOT ARM CONTROL, AND STORAGE MEDIUM STORING INSTRUCTIONS TO PERFORM METHOD TRAINING HIERARCHICAL REINFORCEMENT LEARNING MODEL FOR ROBOT ARM CONTROL

(71) Applicants: AGENCY FOR DEFENSE DEVELOPMENT, Daejeon (KR); SEOUL NATIONAL UNIVERSITY R&DB FOUNDATION, Seoul (KR)

(72) Inventors: Ganghun Lee, Seoul (KR); Byoung Tak Zhang, Seoul (KR); Minji Kim, Seoul (KR); Minsu Lee, Seoul (KR)

(73) Assignees: Agency for Defense Development, Daejeon (KR); Seoul National University R & DB Foundation, Seoul (KR)

( * ) Notice: Subject to any disclaimer, the term of this patent is extended or adjusted under 35 U.S.C. 154(b) by 135 days.

(21) Appl. No.: 18/490,242

(22) Filed: Oct. 19, 2023

(65) Prior Publication Data

US 2024/0131700 A1      Apr. 25, 2024
US 2024/0227181 A9      Jul. 11, 2024

(30) Foreign Application Priority Data

Oct. 19, 2022    (KR) ........................ 10-2022-0135026

(51) Int. Cl.
*B25J 9/16* (2006.01)

(52) U.S. Cl.
CPC .............. *B25J 9/163* (2013.01); *B25J 9/1664* (2013.01)

(58) Field of Classification Search
CPC ........ B25J 9/163; B25J 9/1664; B25J 9/1679; B25J 9/1671; B25J 9/161; B25J 9/1653;
(Continued)

(56) References Cited

U.S. PATENT DOCUMENTS

2025/0010466 A1 * 1/2025 Lee .......................... B25J 13/02

OTHER PUBLICATIONS

Pacheco-Portuguez et al "Sketch Recognition Library Applied for an Image Replication with a Humanoid Robot in a Simulated Environment" 2020, 3rd International Conference on Mechatronics, Robotics and Automation, pp. 110-115 (Year: 2020).*
(Continued)

*Primary Examiner* — Esvinder Singh
(74) *Attorney, Agent, or Firm* — Knobbe, Martens, Olson & Bear, LLP

(57) ABSTRACT

A robot arm control device is proposed. The robot arm control device may include a memory. The device may also include an acquisition unit acquiring an arbitrary target image, a virtual canvas image in which a virtual drawing operation of a robot arm for the target image is reflected, and a virtual nib image of the robot arm whose position is changed as the virtual drawing operation is reflected in the virtual canvas image. The device may further include a processor configured to input the target image to the pre-trained learning model, determine a position change amount of the virtual nib image in the virtual canvas image using the pre-trained learning model, and output a joint angle change amount for driving the robot arm on the basis of the position change amount.

13 Claims, 9 Drawing Sheets

(58) Field of Classification Search
CPC .... B25J 9/1669; B25J 9/1697; B25J 11/0075;
B25J 19/021; G06N 3/008; G06N 3/045;
G06N 3/08; G06N 3/092; G05B 19/4205;
G05B 19/4202; G05B 2219/36324
See application file for complete search history.

(56) References Cited

OTHER PUBLICATIONS

Office Action dated Aug. 22, 2025 in Korean Application No. 10-2022-0135026, in 10 pages.
Lee, "Design of Artificial Drawing Artist Using Deep Reinforcement Learning", Seoul National University Graduate School, Interdisciplinary Program in Cognitive Science, Master's Thesis, approved Aug. 2022.

* cited by examiner

124

1

ROBOT ARM CONTROL DEVICE, METHOD FOR TRAINING HIERARCHICAL REINFORCEMENT LEARNING MODEL FOR ROBOT ARM CONTROL, AND STORAGE MEDIUM STORING INSTRUCTIONS TO PERFORM METHOD TRAINING HIERARCHICAL REINFORCEMENT LEARNING MODEL FOR ROBOT ARM CONTROL

RELATED APPLICATIONS

The present application claims the benefit of Korean Patent Application No. 10-2022-0135026 filed on Oct. 19, 2022 in the Korean Intellectual Property Office, the entire disclosure of which is incorporated herein by reference.

TECHNICAL FIELD

The present disclosure relates to robot arm control technology and neural network-based reinforcement learning for the same.

This work was supported by Korea Institute for Advancement of Technology (KIAT) grant funded by the Korea Government (MOTIE) (Project No.: 0670-20200024, and Research Project Title: Development of Learning Technologies that Mimic Human Demonstrations for Virtual Reality Environments to Assist Humans through Physical Interactions with Robots), Institute of Information & communications Technology Planning & Evaluation (IITP) grant funded by Korea government (MSIT) (Project No.: 0536-20210014, and Research Project Title: Development of Cognitive Agent Software Based on Everyday Life Learning), Institute of Information & communications Technology Planning & Evaluation (IITP) grant funded by Korea government (MSIT) (Project Nos.: 0536-20210014, 0670-20210003, 0670-20210040, and 0536-20210024, and Research Project Titles: Development of Cognitive Agent Software Based on Everyday Life Learning, Development of Machine Learning Techniques Based on Imitation of Foundational Infancy Stage Real-World Interaction Experiences for Brain and Cognitive Development Processes, Research and Development of Artificial Intelligence Innovation Hub, and Development of Robotic Hand Manipulation Intelligence for Learning How to Handle Various Objects with a Tactile-Capable Robotic Hand), and National Research Foundation of Korea (NRF) grant funded by Korea government (MSIT) (Project No.: 0670-20210040, and Research Project Title: Research on Goal-Oriented Self-Directed Reinforcement Learning Techniques for Real-World Applications).

BACKGROUND

Due to the advancement of robotics, various types of robot control technology are being applied to the art field.

Existing robot control technology for drawing adopts a method of decomposing a target image using a mathematical method to obtain a sequential process for drawing the target image or performing learning to imitate drawing process data created by a person and manipulating a robot using kinematics.

Such a method largely relies on human design, which limits the range of application and incurs high costs.

SUMMARY

An embodiment of the present disclosure proposes robot arm control technology for realizing drawing using model-free reinforcement learning based on a neural network and computer vision deep-learning.

An embodiment of the present disclosure proposes hierarchical reinforcement learning technology applicable to control of a drawing robot arm by separately learning positions of a virtual nib of a robot arm and learning a joint angle change amount.

The aspects of the present disclosure are not limited to the foregoing, and other aspects not mentioned herein will be clearly understood by those skilled in the art from the following description.

In accordance with an aspect of the present disclosure, there is provided a robot arm control device, the robot arm control device comprises: a memory storing one or more instructions for processing a pre-trained learning model for controlling a robot arm; an acquisition unit acquiring an arbitrary target image, a virtual canvas image in which a virtual drawing operation of the robot arm for the target image is reflected, and a virtual nib image of the robot arm whose position is changed as the virtual drawing operation is reflected in the virtual canvas image; and a processor executing the one or more instructions stored in the memory, wherein the instructions, when executed by the processor, cause the processor to input the target image to the pre-trained learning model, determine a position change amount of the virtual nib image in the virtual canvas image using the pre-trained learning model, and output a joint angle change amount for driving the robot arm on the basis of the position change amount.

The learning model may include a commander configured to determine the position change amount, and a stroker configured to output the joint angle change amount.

The commander may be trained to output a position change amount that satisfies a target position change amount of the robot arm when the target image is input, and the stroker is trained to output the joint angle change amount of the robot arm when the position change amount and a joint angle of the robot arm are input.

When the robot arm is driven on the basis of the joint angle change amount, the processor may be configured to measure position information of an actual nib mounted on the robot arm and reflect the position information of the actual nib in the virtual nib image.

In accordance with another aspect of the present disclosure, there is provided a hierarchical reinforcement learning method of a hierarchical reinforcement learning device including a first learning model and a second learning model for controlling a robot arm, the method comprises: acquiring an arbitrary target image, a virtual canvas image in which a virtual drawing operation of the robot arm for the target image is reflected, and a virtual nib image of the robot arm whose position is changed as the virtual drawing operation is reflected in the virtual canvas image; training the first learning model such that the virtual canvas image corresponds to the target image on the basis of a position of the virtual nib image in the virtual canvas image; and training the second learning model such that a joint angle change amount of the virtual robot arm corresponds to a target position change amount of the virtual nib image.

The training of the first learning model may include determining a position change amount for changing the position of the virtual nib image within the virtual canvas image; and determining an amount of change in similarity between the target image and the virtual canvas image in which the virtual drawing operation is reflected step by step on the basis of the position change amount, and determining a compensation value according to the amount of change in similarity.

The determining of the position change amount may include performing reinforcement learning on the basis of the compensation value.

The training of the second learning model may include receiving a joint angle of the virtual robot arm and the target position change amount, and determining the joint angle change amount of the robot arm.

The hierarchical reinforcement learning method may comprise determining similarity between a position change amount of the virtual nib changed according to the joint angle change amount and the target position change amount; and performing reinforcement learning on the basis of a compensation value according to the similarity.

The target position change amount may be updated each time the joint angle change amount is determined.

In accordance with another aspect of the present disclosure, there is provided a non-transitory computer-readable storage medium storing a computer program, which comprises instructions for a processor to perform a robot arm control method using a hierarchical reinforcement learning model, the method comprise: acquiring an arbitrary target image, a virtual canvas image in which a virtual drawing operation of the robot arm for the target image is reflected, and a virtual nib image of the robot arm whose position is changed as the virtual drawing operation is reflected within the virtual canvas image; performing processing such that the hierarchical reinforcement learning model determines a position change amount of the virtual nib image in the virtual canvas image when the target image is input to the hierarchical reinforcement learning model; and performing processing such that a joint angle change amount for driving the robot arm is output on the basis of the position change amount.

The learning model may be trained to output a position change amount that satisfies a target position change amount of the robot arm when the target image is input, and trained to output a joint angle change amount of the robot arm when the position change amount and a joint angle of the robot arm are input.

The hierarchical reinforcement learning method may comprise: measuring position information of an actual nib mounted on the robot arm when the robot arm is driven on the basis of the joint angle change amount; and reflecting the position information of the actual nib in the virtual nib image.

According to an embodiment of the present disclosure, it is possible to obtain results of a natural target picture at low cost without knowledge-based prior design by separately learning positions of a virtual nib of a robot arm and learning a joint angle change amount to construct a hierarchical reinforcement learning model and controlling the robot arm through the constructed hierarchical reinforcement learning model to reach the target picture.

DETAILED DESCRIPTION

Figure 1:
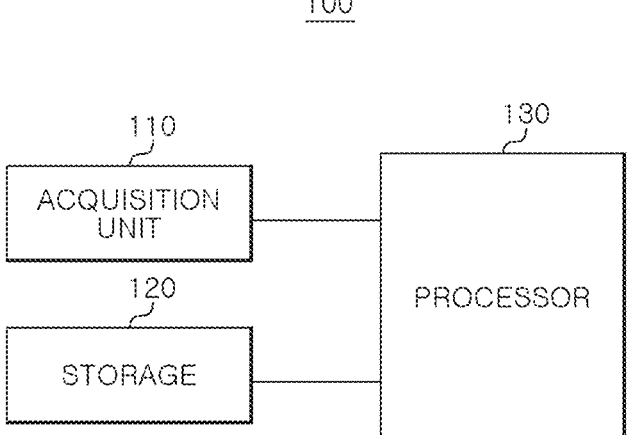
FIG. 1 is a block diagram showing a device for controlling a robot arm or training a learning model for robot arm control according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Hereinafter, embodiments of the present disclosure will be described in detail with reference to the attached drawings.

FIG. 1 is a block diagram showing a device 100 for controlling a robot arm or training a learning model for robot arm control according to an embodiment of the present disclosure.

That is, the configuration of the embodiment of FIG. 1 can be applied for a hierarchical reinforcement learning function for robot arm control and a robot arm control function through this hierarchical reinforcement learning in parallel.

First, the device 100 for performing the hierarchical reinforcement learning function for robot arm control will be described in detail with reference to FIGS. 1 to 6.

As shown in FIG. 1, the hierarchical reinforcement learning device 100 according to an embodiment of the present disclosure may include an acquisition unit 110, a storage 120, and a processor 130.

First, the acquisition unit 110 may acquire an arbitrary target image, a virtual canvas image reflecting a virtual drawing operation of a virtual robot arm for the target image, and a virtual nib image of the virtual robot arm whose position is changed as the virtual drawing operation is reflected in the virtual canvas image.

Figure 2:
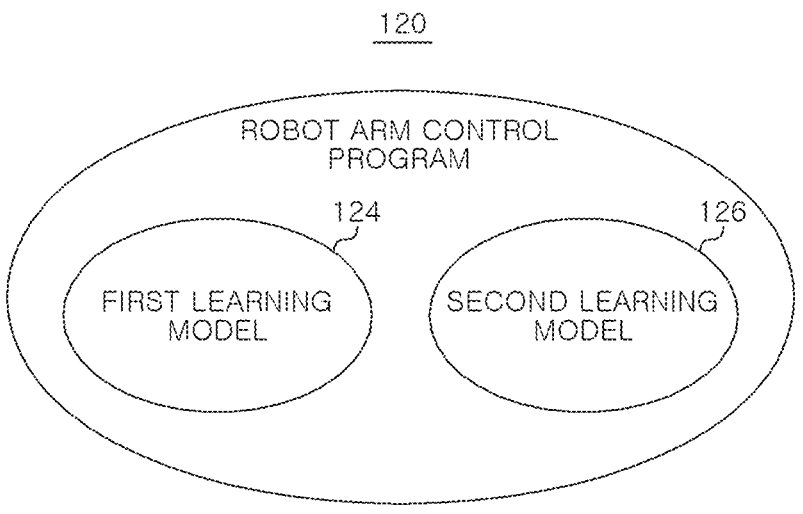
FIG. 2 is a detailed diagram showing a configuration of a storage of FIG. 1 and is a conceptual diagram for describing a learning process.

As shown in FIG. 2, the storage 120 of the hierarchical reinforcement learning device 100 may store a robot arm control program 122 and information necessary to execute the robot arm control program 122, and the robot arm control program 122 may include a first learning model 124 and a second learning model 126 for robot arm control. As will be described later, the first learning model 124 in the hierarchical reinforcement learning device 100 may include a commander 124a and a discriminator 124b, and the second learning model 126 may include a stroker 126a.

The processor 130 may serve to train the first learning model 124 such that the virtual canvas image corresponds to (reaches) the target image on the basis of the position of the virtual nib image within the virtual canvas image and train the second learning model 126 such that a joint angle change amount of the virtual robot arm corresponds to a target position change amount of the virtual nib image.

Figure 3:
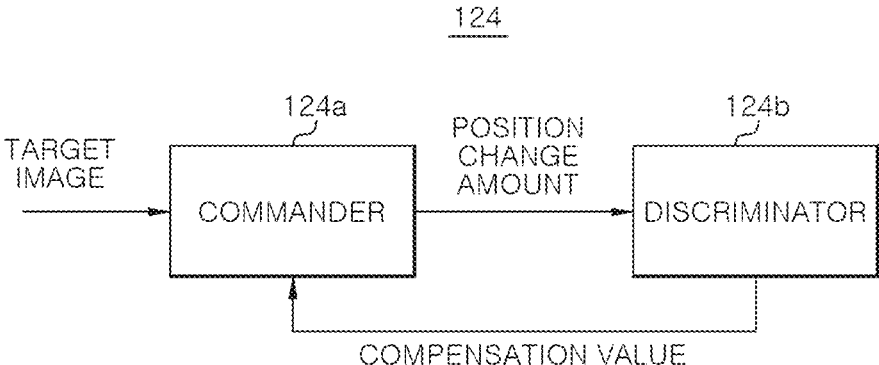
FIG. 3 is a diagram for describing a configuration and a learning process of a first learning model of FIG. 2.

FIG. 3 is a diagram for describing a configuration and a learning process of the first learning model 124 of FIG. 2.

As shown in FIG. 3, the first learning model 124 may include the commander 124a and the discriminator 124b.

The commander 124a may determine a position change amount for changing the position of the virtual nib image within the virtual canvas image.

The discriminator 124b may determine the amount of change in similarity between the target image and the virtual canvas image in which the virtual drawing operation is reflected step by step on the basis of the position change amount of the commander 124a and determine a compensation value according to the amount of change in similarity. For example, the discriminator 124b may determine a positive (+) compensation value if the similarity change amount is equal to or greater than a threshold value and may determine a negative (−) compensation value if the similarity change amount is less than the threshold value.

Here, the commander 124a may perform reinforcement learning based on the compensation value of the discriminator 124b.

Accordingly, the commander 124a can be trained to receive a high compensation value, and the discriminator 124b can also be trained at the same time.

Figure 4:
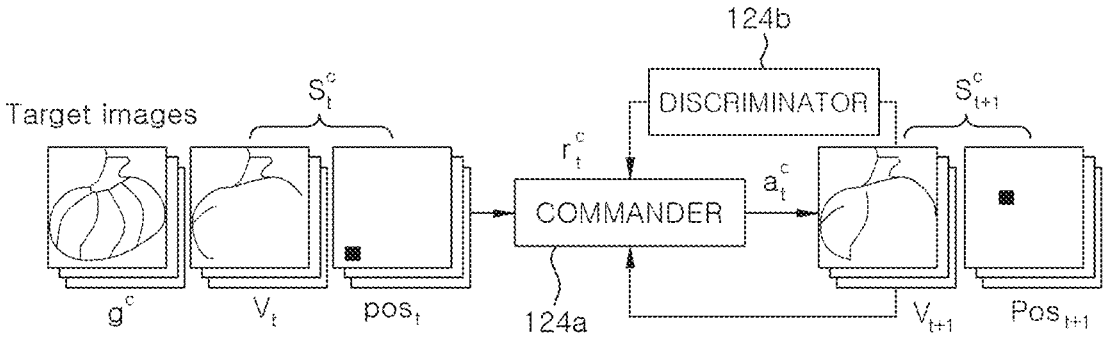
FIG. 4 is a specific conceptual diagram of FIG. 3.

The first learning model 124 of FIG. 3 will be described in more detail with reference to FIG. 4.

First, when target images $g^c$, virtual canvas images V, and virtual nib images pos are input through the acquisition unit 110, the processor 130 may train the first learning model 124 such that the virtual canvas images V reaches the target images $g^c$ on the basis of positions of the virtual nib images pos within the virtual canvas images V.

Specifically, the commander 124a in the first learning model 124 may determine a position change amount $a^c$ for changing the positions of the virtual nib images pos within the virtual canvas images V, and accordingly, the first learning model 124 may perform a virtual drawing operation step by step and reflect the changed virtual canvas images $V_t \rightarrow V_{t+1}$ and the changed virtual nib images $\text{pos}_t \rightarrow \text{pos}_{t+1}$.

Accordingly, the discriminator 124b may determine the amount of change in similarity between the target images $g^c$ and the virtual canvas images $V_t \rightarrow V_{t+1}$ in which the virtual drawing operation is reflected step by step on the basis of the position change amount $a^c$, determine a compensation value $r^c$ according to the determined similarity change amount, and provide the compensation value to the commander 124a.

The commander 124a may perform reinforcement learning based on the compensation value $r^c$ of the discriminator 124b.

Figure 5:
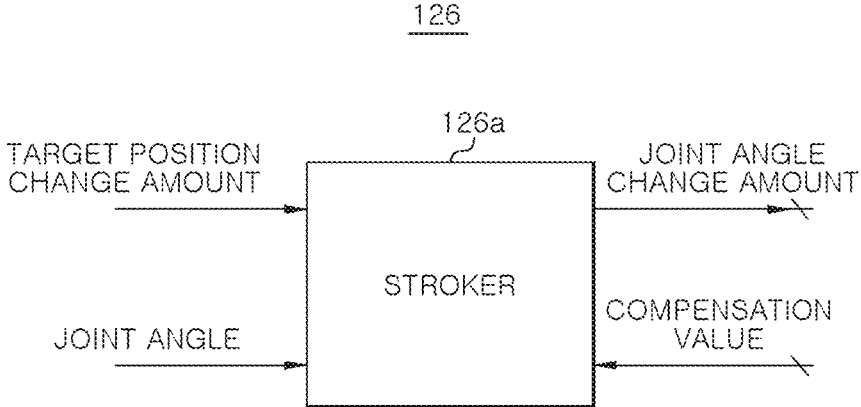
FIG. 5 is a diagram for describing a configuration and a learning process of a second learning model of FIG. 2.

FIG. 5 is a diagram for describing a configuration and a learning process of the second learning model 126 of FIG. 2.

The second learning model 126 may include the stroker 126a that receives a joint angle and a target position change amount of the virtual robot arm and determines a joint angle change amount of the robot arm. This stroker 126a can independently perform learning in an environment independent of the above-described commander 124a.

Figure 6:
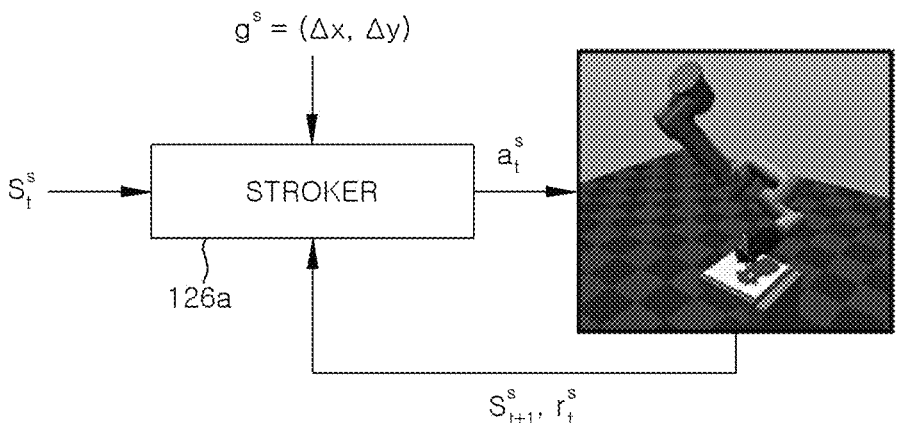
FIG. 6 is a specific conceptual diagram of FIG. 5.

The second learning model 126 of FIG. 5 will be described in more detail with reference to FIG. 6.

First, when a joint angle $s^s$ and a target position change amount $g^s$ of the virtual robot arm are input to the stroker 126a, the stroker 126a may determine a joint angle change amount $a^s$ of the robot arm on the basis of the joint angle $s^s$ and the target position change amount $g^s$.

Accordingly, the processor 130 can determine similarity between the position change amount of the virtual nib changed according to the joint angle change amount $a^s$ and the target position change amount $g^s$, and the stroker 126a can perform reinforcement learning on the basis of a compensation value $r^s$ according to the similarity.

Here, the above-described target position change amount $g^s$ may be updated each time the joint angle change amount $a^s$ is determined.

Meanwhile, the robot arm control device 100 using hierarchical reinforcement learning will be described in detail with reference to FIGS. 1, 7, 8, and 9.

As shown in FIG. 1, the robot arm control device 100 may include the acquisition unit 110, the storage 120, and the processor 130.

The acquisition unit 110 may acquire an arbitrary target image, a virtual canvas image in which a virtual drawing operation of a virtual robot arm for the target image is reflected, and a virtual nib image of the virtual robot arm whose position is changed as the virtual drawing operation is reflected in the virtual canvas image.

Figure 7:
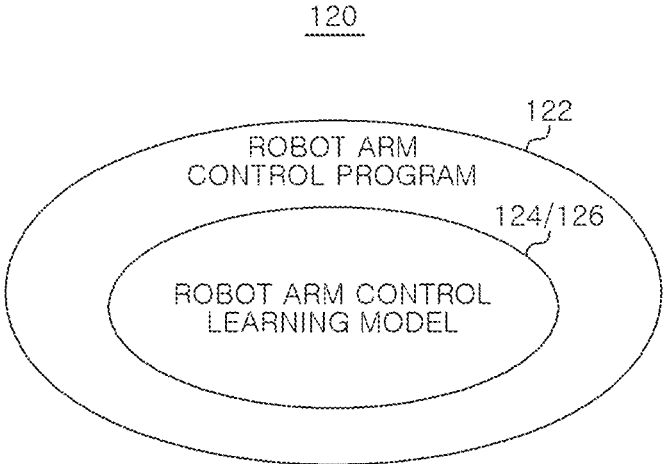
FIG. 7 is a detailed diagram showing a configuration of the storage of FIG. 1 and is a conceptual diagram for describing an execution process after learning.

As shown in FIG. 7, the storage 120 of the hierarchical reinforcement learning device 100 may store the robot arm control program 122 and information necessary to execute the robot arm control program 122. The robot arm control program 122 may include a robot arm control learning model 124/126 for robot arm control. As will be described later, the learning model 124/126 in the robot arm control device 100 may include the commander 124a and the stroker 126a.

When the target image is input to the robot arm control learning model 124/126 in the program, the processor 130 may perform processing such that the robot arm control learning model 124/126 determines a position change amount of the virtual nib image in the virtual canvas image and outputs a joint angle change amount for driving the robot arm on the basis of the position change amount.

Figure 8:
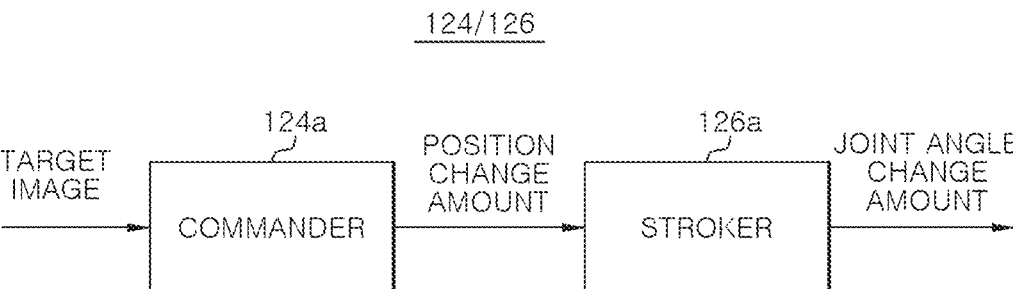
FIG. 8 is a diagram for describing a configuration of a robot arm control learning model of FIG. 7 and a robot arm control process using the same.

FIG. 8 is a diagram for describing the configuration of the robot arm control learning model 124/126 of FIG. 7 and a robot arm control process using the same.

The robot arm control learning model 124/126 of FIG. 8 may include the commander 124a and the stroker 126a. That is, in an embodiment of the present disclosure, a single learning model 124/126 is implemented by combining the commander 124a and stroker 126a which are independently trained in FIGS. 1 to 6, and the robot arm control device 100 can complete a target picture by accurately reflecting the position of the nib and the joint angle of the robot arm through the robot arm control learning model 124/126.

As shown in FIG. 8, when a target image is input, the commander 124a can determine a position change amount of a virtual nib.

The stroker 126a can output a joint angle change amount of the robot arm on the basis of the position change amount determined by the commander 124a.

Figure 9:
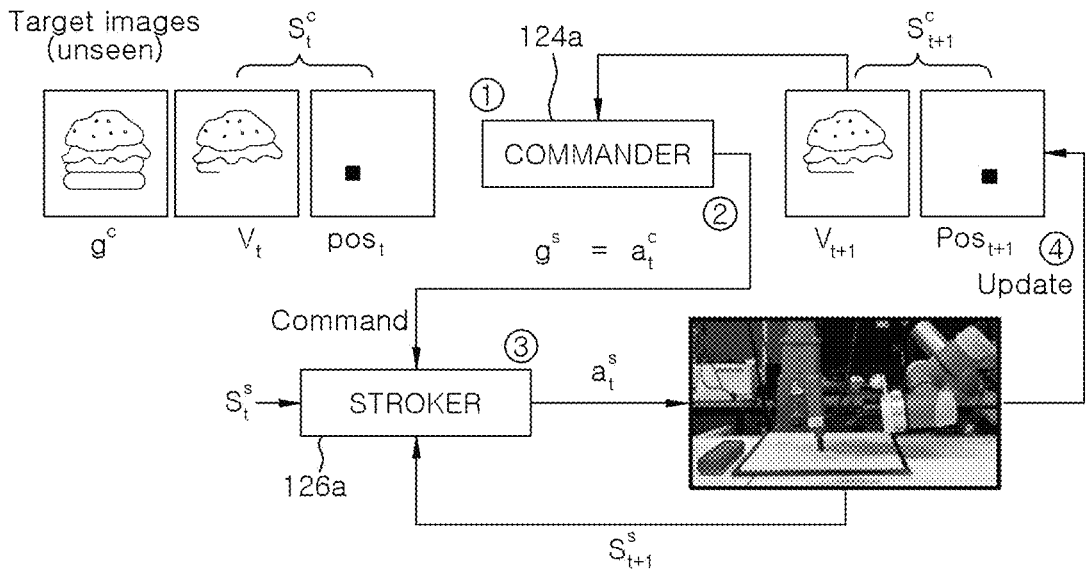
FIG. 9 is a specific conceptual diagram of FIG. 8.

FIG. 9 is a diagram for describing the configuration and learning process of the robot arm control learning model 124/126 of FIG. 8 in more detail.

First, when a target image $g^c$, a virtual canvas image V, and a virtual nib image pos are input through the acquisition unit 110, the processor 130 may perform processing such that a position change amount $a^c$ of the virtual nib which satisfies a target position change amount $g^s$ of the robot arm is output through the commander 124a of the robot arm control learning model 124/126.

Thereafter, the processor 130 may perform processing such that a joint angle change amount $a^s$ of the robot arm is output through the stroker 126a of the robot arm control learning model 124/126. Specifically, the processor 130 may input the position change amount $a^c$ of the virtual nib and a joint angle $s^s$ of the robot arm to the stroker 126a and perform processing such that the joint angle change amount $a^s$ of the robot arm is output.

If this joint angle change amount $a^s$ is reflected in the robot arm control device 100, the processor 130 can generate a control value for actually driving the robot arm. This control value may be applied to a robot arm driver (not shown), and the robot arm driver may be driven at a certain angle according to the control value based on the joint angle change amount $a^s$.

When the robot arm is driven by the robot arm driver, the processor 130 can measure position information of an actual nib mounted on the robot arm. Such position information can be measured independently by the robot arm driver.

When the position information of the actual nib is measured, the processor 130 may reflect the measured position information in the virtual nib image pos in the virtual canvas image V.

Thereafter, the process in which the commander 124a determines the position change amount $a^c$ and the stroker 126a determines the joint angle change amount $a^s$ is repeated to complete the target image $g^c$.

According to the embodiments of the present disclosure $a^s$ described above, it is possible to obtain results of a natural target picture at low cost without knowledge-based prior design by separately learning positions of a virtual nib of a robot arm and learning a joint angle change amount to construct a hierarchical reinforcement learning model and controlling the robot arm through the constructed hierarchical reinforcement learning model to reach the target picture. In addition, in the embodiments of the present disclosure, an action is determined by drawing on a virtual canvas while drawing an actual picture through the robot arm, and thus there is an advantage that there is no need to check the actual picture and thus equipment such as a camera is not necessary.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A robot arm control device comprising:
a memory storing one or more instructions configured to process a pre-trained learning model for controlling a robot arm;
an acquisition unit configured to acquire an arbitrary target image, a virtual canvas image in which a virtual drawing operation of the robot arm for the target image is reflected, and a virtual nib image of the robot arm whose position is changed as the virtual drawing operation is reflected in the virtual canvas image; and
a processor configured to execute the one or more instructions to:
input the target image to the pre-trained learning model,
determine a position change amount of the virtual nib image in the virtual canvas image using the pre-trained learning model,
output a joint angle change amount for driving the robot arm on the basis of the position change amount, and
drive the robot arm according to the joint angle change amount.

2. The robot arm control device of claim 1, wherein the learning model includes a commander configured to determine the position change amount, and a stroker configured to output the joint angle change amount.

3. The robot arm control device of claim 2, wherein the commander is configured to be trained to output a position change amount that satisfies a target position change amount of the robot arm when the target image is input, and
wherein the stroker is configured to be trained to output the joint angle change amount of the robot arm when the position change amount and a joint angle of the robot arm are input.

4. The robot arm control device of claim 1, wherein a robot arm driver is configured to measure position information of an actual nib mounted on the robot arm, and wherein the processor is configured to receive the measured position information from the robot arm driver and reflect the received position information of the actual nib in the virtual nib image.

5. A hierarchical reinforcement learning method of a hierarchical reinforcement learning device including a first learning model and a second learning model for controlling a robot arm, the hierarchical reinforcement learning method comprising:
acquiring an arbitrary target image, a virtual canvas image in which a virtual drawing operation of the robot arm for the target image is reflected, and a virtual nib image of the robot arm whose position is changed as the virtual drawing operation is reflected in the virtual canvas image;
training the first learning model such that the virtual canvas image corresponds to the target image on the basis of a position of the virtual nib image in the virtual canvas image;
training the second learning model such that a joint angle change amount of a virtual robot arm corresponds to a target position change amount of the virtual nib image; and
controlling the robot arm according to the joint angle change amount.

6. The hierarchical reinforcement learning method of claim 5, wherein the training of the first learning model includes:

determining a position change amount for changing the position of the virtual nib image within the virtual canvas image; and
determining an amount of change in similarity between the target image and the virtual canvas image in which the virtual drawing operation is reflected step by step on the basis of the position change amount, and determining a compensation value according to the amount of change in similarity.

7. The hierarchical reinforcement learning method of claim 6, wherein the determining of the position change amount includes performing reinforcement learning on the basis of the compensation value.

8. The hierarchical reinforcement learning method of claim 5, wherein the training of the second learning model includes receiving a joint angle of the virtual robot arm and the target position change amount, and determining the joint angle change amount of the virtual robot arm.

9. The hierarchical reinforcement learning method of claim 8, further comprising:
determining similarity between a position change amount of the virtual nib changed according to the joint angle change amount and the target position change amount; and
performing reinforcement learning on the basis of a compensation value according to the similarity.

10. The hierarchical reinforcement learning method of claim 9, wherein the target position change amount is updated each time the joint angle change amount is determined.

11. A non-transitory computer-readable storage medium storing computer executable instructions, wherein the instructions, when executed by a processor, cause the processor to perform a robot arm control method using a hierarchical reinforcement learning model, the method comprising:
acquiring an arbitrary target image, a virtual canvas image in which a virtual drawing operation of the robot arm for the target image is reflected, and a virtual nib image of the robot arm whose position is changed as the virtual drawing operation is reflected within the virtual canvas image;
performing processing such that the hierarchical reinforcement learning model determines a position change amount of the virtual nib image in the virtual canvas image when the target image is input to the hierarchical reinforcement learning model;
performing processing such that a joint angle change amount for driving the robot arm is output on the basis of the position change amount; and
driving the robot arm according to the joint angle change amount.

12. The non-transitory computer-readable storage medium of claim 11, wherein the learning model is trained to output a position change amount that satisfies a target position change amount of the robot arm when the target image is input, and trained to output a joint angle change amount of the robot arm when the position change amount and a joint angle of the robot arm are input.

13. The non-transitory computer-readable storage medium of claim 11, further comprising:
measuring position information of an actual nib mounted on the robot arm when the robot arm is driven on the basis of the joint angle change amount; and reflecting the position information of the actual nib in the virtual nib image.

* * * * *